(No Model.) 2 Sheets—Sheet 2.
E. PLECHAWSKI.
GEOGRAPHICAL TIME INDICATOR.
No. 434,137. Patented Aug. 12, 1890.
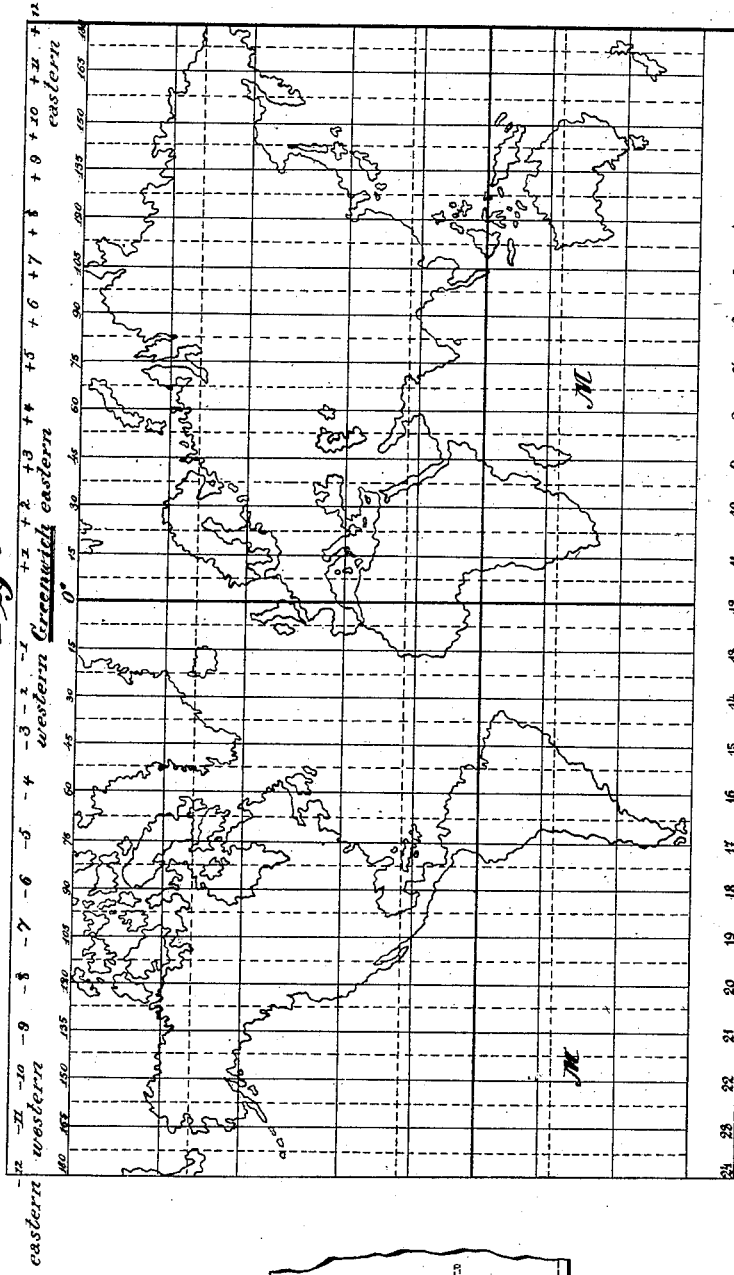
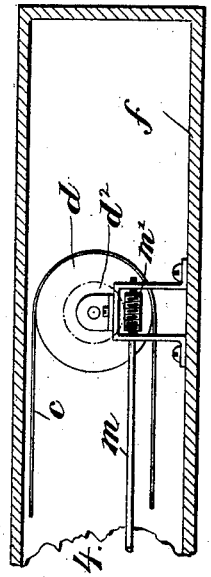
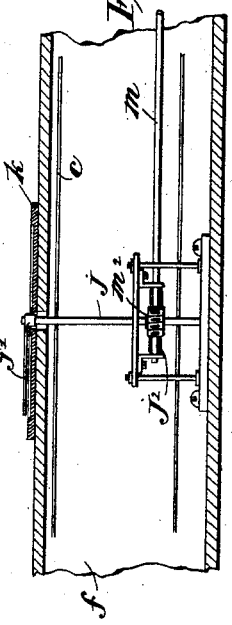
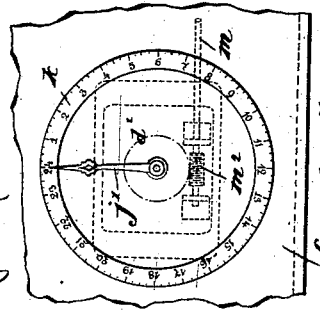
Witnesses:
Henry T. Dieterich
J. Thomson Cross
Inventor:
Emil Plechawski.
per: [signature]
Attorney:

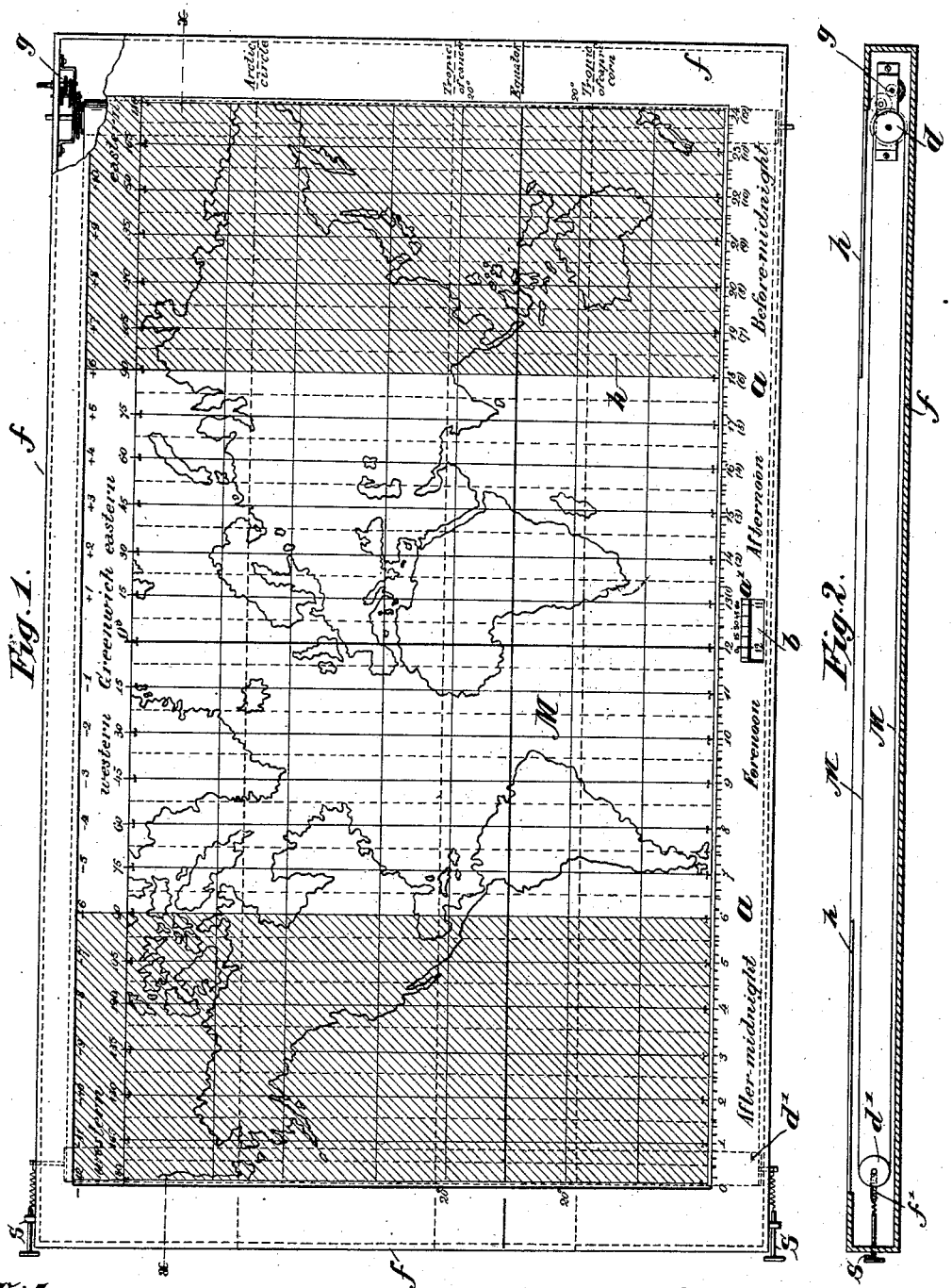

UNITED STATES PATENT OFFICE.

EMIL PLECHAWSKI, OF VIENNA, AUSTRIA-HUNGARY.

GEOGRAPHICAL TIME-INDICATOR.

SPECIFICATION forming part of Letters Patent No. 434,137, dated August 12, 1890.

Application filed March 14, 1890. Serial No. 343,919. (No model.)

*To all whom it may concern:*

Be it known that I, EMIL PLECHAWSKI, a subject of the Emperor of Austria-Hungary, residing at Ober-Döbling, near Vienna, in the Province of Lower Austria, in the Empire of Austria-Hungary, have invented certain new and useful improvements in apparatus for indicating at once the absolute time and hour-zone time corresponding to the mean time of any given point of the globe; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Referring to the drawings, Figure 1 is a top plan view of a time-indicator embodying my invention. Fig. 2 is a section taken on or about on line $xx$ of Fig. 1. Fig. 3 is a face view of a Mercator chart as prepared for use in the said apparatus. Fig. 4 is a section of the casing, showing mechanism for transmitting the movements of the charts to a pointer or hand arranged to travel over a graduated dial. Fig. 5 is a face view of the pointer or hand and dial.

The invention has for its object to provide an apparatus of simple construction and readily manipulated, whereby the absolute time as well as the hour-zone time of any given locality on the globe corresponding to the mean time of such locality may be ascertained at a glance.

The invention consists in the combination, with a Mercator chart or projection, of the map of the world of elements, by means of which the object of the invention is attained, and in the illustration and description of the invention I have chosen the meridian of Greenwich for ascertaining the absolute time, though it will be obvious that any other desired meridian may be selected.

Referring to Fig. 3, M shows a Mercator chart or map of the world prepared according to my invention, in which the meridian of Greenwich is rendered distinguishable from the other meridians by a heavier line. At the upper end of each meridian the longitude is indicated in degrees east and west of Greenwich, as well as the difference in time by hours, this difference being positive east of Greenwich and negative west thereof. In order also to indicate the so-called "hour-zones" I divide the meridians as shown in dotted lines, the strips between these dotted meridians being called the "hour-zone"—as, for instance, the strip between $7\frac{1}{2}°$ east of Greenwich and $7\frac{1}{2}°$ west thereof, or between $7\frac{1}{2}°$ and $22\frac{1}{2}°$ east or west of Greenwich, and so on—and for certain purposes—as, for instance, for railway traffic—the mean time of the meridians between the half meridians is usually considered as the mean time of the zone. Above the meridional indices I mark the difference in hours $+$ or $-$ east or west of the given meridian, (Greenwich,) and below said meridians I affix an hour-index, the standard meridian having the noon hour at the foot thereof, the hours decreasing in regular order east of the standard meridian, as 11, 10, 9, &c., to 1, while west of said standard meridian the hours increase from 13 to 24, as shown in Fig. 3.

In conjunction with the map M, constructed or prepared as described, I employ a time-index or scale $a$, in every respect similar to the time-index on the map, except that the order of the hours east and west of the standard meridian are reversed, as shown in Fig. 1. Furthermore, a slot $b$ is formed in said index below the noon hour. The slot $b$ is of a length equal to or slightly greater than the space between two meridional divisions, and has a scale $a'$ graduated to quarter-hours arranged along its upper edge, as shown in Fig. 1, and in practice each hour-subdivision of the scale is or may be graduated so that fractional-hour time may be obtained, or said graduations may extend to minute graduations.

Supposing the map to be arranged so as to slide along the scale $a$, and it is desired to ascertain the time corresponding to noon time at Washington, D. C. The map is moved from left to right until the twelve or noon index of the scale will coincide with the meridian of Washington, at the foot of. which the seventeenth hour is indicated, and will then be visible through the slot $b$. The same result may be obtained by making the scale $a$ movable, the map M being stationary, or by making both map and scale movable, so that one can be moved in one direction and the other in the reverse direction.

In practice, and for greater convenience, I make the map movable, and to this end I employ two similar maps M, connected together in the form of an endless apron and mount them on suitable rollers $d$ and $d'$, that have their bearings in an open-top frame, the opening of which is or may be closed by a pane of glass, and in order to more plainly show those parts of the world that are in darkness relatively to other parts where there is daylight, the pane of glass which may then be considered as a portion of the scale, or corresponding portions of the scale $a$ itself, or both, are or may be of a different color, and the scale $a$ may thus be divided into four quarters, indicated by "Afternoon," "Before midnight," "After midnight" and "Forenoon," as shown in Fig. 1. Motion may be imparted to one of the rollers—as to roller $d$, for instance—by means of a crank applied to the squared journal of the roller, said journal projecting out of the casing $f$; or said roller may be driven by means of a suitable clock-going train, as partly shown at $g$, Fig. 1. In order that the endless maps M may be held at a proper tension, the journals of the roll $d'$ have their bearings in slots $f'$ in the casing $f$, said journals being connected to a spring, the tension of which can be adjusted by means of an adjusting-screw S, working in threaded bearings $f^2$, secured to the casing $f$, as shown in Fig. 1.

Instead of the slot in the scale $a$, through which the absolute time is visible, the motion of the map may be communicated to a hand traveling over a dial divided into twenty-four hours and fractions thereof, as shown in Figs. 4 and 5. In this case the roller $d$ carries a worm-wheel $d^2$, that is in gear with a worm $m'$, on a horizontal shaft $m$. The shaft $m$ carries at its other end a second worm $m^2$, that is in gear with a worm-wheel $j^2$ on the arbor of the hand $j'$, that travels over the dial $k$. By means of this arrangement the absolute time is indicated by the hand as the maps are set in motion. Thus, for instance, if at 11 a. m., Washington, it is desired to ascertain the absolute time the maps are set in motion to bring the meridian of Washington to 11 a. m., the hand on the dial will move to the sixteenth-hour indication, showing the absolute time, and at a glance at the map all those parts of the world at the time in darkness will be covered by the stained portion of the glass face, or lie above the differently-colored portions of the scale $a$. On the other hand, suppose at 1 o'clock a. m., at Washington, it is desired to ascertain the absolute time the maps are moved until the meridian of Washington coincides with 1 o'clock a. m. on the scale, the sixth hour will be visible through the slot $b$, or will be indicated by the hand $j'$, and at the same time all those portions of the globe then in darkness will be covered by the stained portions of the glass face, or lie above the correspondingly-colored portions of the scale.

In general I may state that if a given meridian is set to a given hour on the hour-scale $a$ the number on the lower margin of the map visible through the slot or indicated by the hand $j'$ will be the absolute time corresponding to the mean time of the locality in consideration.

Any suitable means may be provided to distinguish the absolute time or standard meridian from the other meridians—as, for instance, by a difference in the thickness of the meridional lines or a difference in their color—the night-hour subdivisions of the scale or of the glass face, or both, may also be indicated, as above stated, by being colored, and the map itself may be colored, if desired, in any usual or preferred manner.

The scale may be printed on a slip of paper and pasted to the framing for the glass face, or it may be marked directly upon said frame in any desired or suitable manner.

When the scale is made movable and the map is stationary, I employ two scales, united with an endless band adapted to be moved as described in respect of the maps, or both the scale and the maps may be made movable, as hereinbefore stated.

Having described my invention, what I claim, and desire to secure by Letters Patent, is—

1. In an apparatus of the class described, comprising a map of the world divided into twenty-four meridians, an hour-index at the foot thereof arranged to decrease from the noon hour to one o'clock eastwardly of a given or standard meridian bearing the said noon hour and to increase westwardly of said standard meridian, or from noon to twenty-four o'clock, in combination with a time-index divided into twenty-four hours, corresponding to the time index on the map, and having the order of the hours reversed east and west of the noon hour, said index being provided with a slot through which the time-indices on the map are rendered visible, said parts being adjustable relatively to each other, substantially as and for the purposes specified.

2. In an apparatus of the class described, comprising a map of the world divided into twenty-four meridians, an hour-index at the foot thereof, arranged to decrease from the noon hour to one o'clock eastwardly of a given or standard meridian bearing the said noon hour, and to increase westwardly of said standard meridian, or from noon to twenty-four o'clock, in combination with a time-index divided into twenty-four hours, corresponding to the time-index on the map, and having the order of the hours reversed east and west of the noon hour, a time-dial, a hand adapted to revolve on the dial and intermediate transmitting mechanism for transmitting the movements of the map to the hand, substantially as and for the purposes specified.

3. In an apparatus of the class described, comprising a map of the world divided into twenty-four meridians of 15°, each meridian being numbered at the head thereof east and west of the 0° or standard meridian 15°, 30°, 45°, &c., to 180°, and having above said subdivisions an index indicating the difference + or − in the time between the standard meridian and that of the other meridians, a time-index at the foot of the meridional divisions, divided into twenty-four parts, corresponding with said divisions, the standard meridian bearing the noon hour, the hours for the meridians east thereof decreasing successively to one o'clock, those west of said standard meridian increasing successively to twenty-four o'clock, in combination with a time-index having corresponding time-divisions arranged in reverse order east and west of its noon hour, said index being provided with a slot of a length equal to one hour subdivision, through which slot the hour-indices on the maps are visible, said parts being adjustable relatively to each other substantially as and for the purposes specified.

4. In an apparatus of the class described, comprising a map of the world divided into twenty-four meridians, a clock mechanism for imparting motion to said map, an hour-index at the foot thereof, arranged to decrease from the noon hour to one o'clock eastwardly of a given or standard meridian bearing the said noon hour, and to increase westwardly of said standard meridian, or from noon to twenty-four o'clock, in combination with a time-index divided into twenty-four hours, corresponding to the time-index on the map, and having the order of the hours reversed east and west of the noon hour, a time-dial, a hand adapted to move over said dial, and intermediate connecting mechanism adapted to transmit to said hand the motion of one of said parts when being adjusted, substantially as and for the purposes specified.

5. In an apparatus of the class described, comprising a map of the world divided into twenty-four meridians, an hour-index at the foot thereof arranged to decrease from the noon hour to one o'clock eastwardly of a given or standard meridian bearing the said noon hour, and to increase westwardly of said standard meridian, or from noon to twenty-four o'clock, in combination with a time-index divided into twenty-four hours, corresponding to the time index on the map, and having the order of the hours reversed east and west of the noon hour, said index having east of the noon hour two subdivisions marked "Afternoon" and "Before midnight," and like divisions west of said hour marked "Forenoon" and "After midnight," respectively, and a slot formed in said index at the noon indication of a length equal to an hour-subdivision, through which slot the hour-indices on the map are visible, substantially as and for the purposes specified.

6. In an apparatus of the class described, comprising a map of the world divided into twenty-four meridians, an hour-index at the foot thereof arranged to decrease from the noon hour to one o'clock eastwardly of a given or standard meridian bearing the said noon hour and to increase westwardly of said standard meridian, or from noon to twenty-four o'clock, in combination with a time-index divided into twenty-four hours, corresponding to the time-index on the map, and having the order of the hours reversed east and west of the noon hour, said index having east of the noon hour two subdivisions marked "Afternoon" and "Before midnight," and like divisions west of said hour marked "Forenoon" and "After midnight," respectively, the divisions marked before and after midnight being made to contrast with those marked before and after noon, and a slot formed in said index at the noon indication of a length equal to an hour-subdivision, through which slot the hour-indices on the map are visible, substantially as and for the purposes specified.

7. In an apparatus of the class described, comprising an open-top casing, a roller journaled at each end thereof, two maps of the world constructed as described and united to form an endless apron adapted to travel around said rollers, in combination with a time-index on the casing having the described hour-divisions, and a slot through which the hour-divisions on the maps may be viewed, and means, substantially such as described, for imparting motion to one of said rollers, substantially as and for the purposes specified.

8. In an apparatus of the class described, comprising an open-top casing, a roller journaled at each end thereof, two maps of the world constructed as described and united to form an endless apron adapted to travel around said rollers, one of said rollers being adjustable for the purpose of adjusting the tension of the endless maps, in combination with a time-index on the casing having the described hour-divisions, and a slot through which the hour-divisions on the maps may be viewed, and means, substantially such as described, for imparting motion to one of said rollers, substantially as and for the purposes specified.

9. In an apparatus of the class described, comprising an open-top casing, a pane of glass secured in the opening, a portion of which glass is stained, as set forth, a roller journaled at each end thereof, two maps of the world constructed as described and united to form an endless apron adapted to travel around said rollers, in combination with a time-index on the casing having the described hour-divisions, and a slot through which the hour-divisions on the maps may be viewed, and means, substantially such as described, for imparting motion to one of said rollers, substantially as and for the purposes specified.

In testimony whereof I affix my signature in presence of two witnesses.

EMIL PLECHAWSKI.

Witnesses:
 RUDOLF VON PLANK,
 NETTIE S. HARRIS.